United States Patent [19]

Gliemeroth

[11] 4,194,807

[45] Mar. 25, 1980

[54] OPTICAL FIBER WAVE-GUIDES FOR SIGNAL TRANSMISSION COMPRISING MULTIPLE COMPONENT GLASS WITH AN ADJUSTED EXPANSION CO-EFFICIENT BETWEEN THE CORE AND MANTLE

[76] Inventor: Georg Gliemeroth, 21 Zeisigweg 18, 6500 Mainz, Fed. Rep. of Germany

[21] Appl. No.: 7,310

[22] Filed: Jan. 29, 1979

Related U.S. Application Data

[63] Continuation of Ser. No. 783,626, Apr. 1, 1977, abandoned.

[30] Foreign Application Priority Data

Apr. 9, 1976 [DE] Fed. Rep. of Germany ....... 2615534

[51] Int. Cl.$^2$ .............................................. G02B 5/14
[52] U.S. Cl. .................... 350/96.31; 65/3 A; 65/7; 106/47 Q; 106/50; 106/52; 106/53; 106/54; 350/96.33; 350/96.34
[58] Field of Search ................. 106/50, 47 Q; 65/3 A; 350/96.31, 96.34, 96.33

[56] References Cited

U.S. PATENT DOCUMENTS

| | | | |
|---|---|---|---|
| 3,614,197 | 10/1971 | Nishizawa et al. .................... | 65/3 A |
| 3,884,550 | 5/1975 | Maurer ................................... | 106/50 |
| 4,025,156 | 5/1977 | Gloge et al. ......................... | 350/96.34 |
| 4,094,689 | 6/1978 | van Ass et al. ..................... | 350/96.31 |
| 4,106,850 | 8/1978 | Marcatili ............................. | 350/96.31 |
| 4,114,980 | 9/1978 | Asam et al. ......................... | 350/96.34 |

FOREIGN PATENT DOCUMENTS

| | | | |
|---|---|---|---|
| 2546162 | 9/1976 | Fed. Rep. of Germany ........ | 350/96.34 |
| 2281330 | 3/1976 | France ................................. | 65/3 A |
| 1108509 | 4/1968 | United Kingdom ................. | 350/96.34 |
| 2434717 | 3/1975 | United Kingdom ................. | 65/3 A |

OTHER PUBLICATIONS

Presby, H. M. et al.—"Material Structure of Germanium-Doped Optical Fibers and Preforms," Bell System Tech. Journal—Dec. 1975, pp. 1681-1692.

*Primary Examiner*—Helen M. McCarthy
*Attorney, Agent, or Firm*—Quaintance, Murphy & Richardson

[57] ABSTRACT

The present invention discloses an optical fiber wave-guide for signal transmission in which the signal fiber has a linear thermal expansion co-efficient in all of the fiber elements above $15 \times 10^{-7}/°C$. in which the outer mantle is composed of the silicon dioxide modified glass, and the optical fiber wave-guide is composed of an inner silicon dioxide-free mantle employing germanium oxide and other components and has an inner silicon dioxide-free core which is composed of germanium oxide and optionally other additives. The fiber is produced according to the chemical vapor deposition process, and preferably has a refractive index gradient which has the shape of a parabola.

7 Claims, 3 Drawing Figures

OPTICAL FIBER WAVE-GUIDES FOR SIGNAL TRANSMISSION COMPRISING MULTIPLE COMPONENT GLASS WITH AN ADJUSTED EXPANSION CO-EFFICIENT BETWEEN THE CORE AND MANTLE

This application is a continuation application filed under the provisions of 37 CFR 1.60 based on co-pending application No. 783,626 filed on Apr. 1, 1977, now abandoned.

The invention comprises an optical fiber wave-guide with a refractive index gradient profile, the optical fiber consisting of three units: an outermost mantle consisting of a silicate multiple component glass; an inner mantle and a core of the fiber which are both silicon dioxide free.

The wave-guiding process occurs to the greatest extent inside the fiber in the core which has a refractive gradient profile through that intended unit. The inner silicon dioxide free mantle contributes only marginally to the wave-guiding process; the outer silicate mantle has no part in the wave-guiding process.

Figure 1:
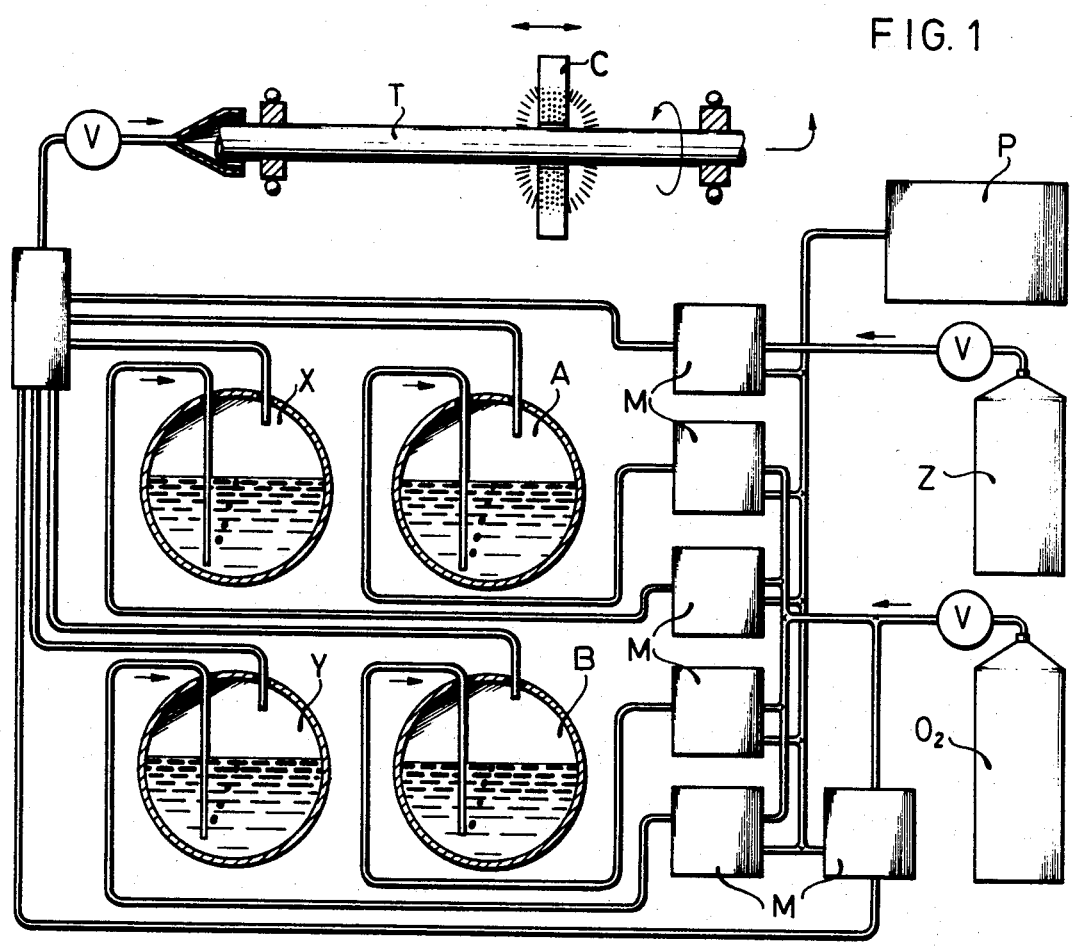
FIG. 1 shows apparatus for production of gas for deposit of oxide on glass tube.

The manufacturing of the wave-guiding fibers with refractive gradient profiles intended for signal transmission is done using two processes, which to be sure are generally different, although both in the first stages of the process use the well-known method of depositing an oxide deposit from the gas phase (CVD process of the semi-conductor technology U.S. Pat. No. 2,236,059).

According to the first patent applications (DT-OS 2,122,895 and DD-S 2,300,061) in the filed of glass fiber manufacture for signal technology, this method of the CVD process is used for the production of a white, soot-like deposit which must be done very cleanly according to the disclosure of the semi-conductor industry.

Later patents (U.S. Pat. No. 3,778,132, DT-OS 2,546,162) go back to the older possibilities of producing a glass directly from the gas phase according to the CVD processes (Fest W. M., Steele S. R. Ready D. W., Physics of Thin Films 5, 1969), Academic Press N.Y., London, Page 290).

Both named process methods serve either for producing outer coating (DT-OS 2,313,249, DT-OS 2,300,013) of a very clean silicon dioxide glass rod with lower refractive index material, namely corresponding to doped silicon dioxide glass; or for the inner coating of a silicon glass hollow rod (DT-OS 2,122,895, DT-OS 2,300,061) with a higher refractive index material, namely again corresponding to doped silicon dioxide glass. After both processes one can similarly proceed to draw directly the outer coated rod as well as the inner coated glass tube to a fiber. The inner coating of the glass tube is known (DT-PS 1,496,542), and the manufacture of glass fibers with wave-guide indexes also is known from DT-PS 745,142 as well as from DT-OS 2,025,921 and U.S. Pat. No. 3,157,726.

An improved process uses the technology of the inner coating of the hollow tube using the MCVD processes as described by French, French International Congress on Glass Number 6, Optical Property and Optical Wave-Guides 6–46 as also described by Mac-Chesney et al, Ibid. 6–40) as well as U.S. Pat. No. 3,778,132. (Additional literature: Appl. Phys. Lett. 23 (1973) 338 and Proc. IEE. 62 (1974) 1280.) Particularly the MCVD is useful in the use of an intermediate procedure in which generally in the process of the inner coating the hollow tube is collapsed to a preform and not immediately drawn to a fiber. The advantage lies above all in the fact that the extremely clean condition of the inner surface of the preform which will later become the core of the fiber is sealed hermetically so that subsequent process steps can be done in a normal industrial atomosphere. These last named process steps of the MCVD processes are clearly different from those of DOS 2,122,895 and DT-0S 2,300,061. The drawing out of an inner coated hollow glass rod to a fiber with a core and mantle has been known for a long time (DT-PS 745,142) and has already been reported for optical fiber wave-guide (DT-OS 2,025,921). All these processes refer to the inner coating of the hollow tube with core material which consists of silicon dioxide alone or doped silicon dioxide in which this material is deposited through deposition from a gas phase on the inner wall in a hollow tube. The use of silicon dioxide or doped silicon dioxide is shown in the teachings of U.S. Pat. No. 2,326,059 and other references (Hyde and Hood) and is relatively problemless.

On the other hand, the use of silicon dioxide alone or doped silicon dioxide or generally the presence of silicon dioxide is a disadvantage in a wave-guiding layer and actually runs counter to the basic idea of optical fiber wave-guides. Only the simple acceptance of this component from previously known CVD technology has justified the use of this component in known circumstances. For the signal technology signal art perhaps no silicon dioxide should be used in the conducting part of the fiber.

In this way, generally higher apertures can be arrived at which as a consequence have better mechanical properties in the fibers; the fiber can be stronger in bending and can withstand greater pressures without hindering the wave-guiding qualities (loss of the transmitted information). Additionally, a higher aperture offers the greater advantage of better and easier optical manipulation; the angle opening is greater, which makes the incoupling of information simple and cheaper. An additional greater advantage is in the increased intensity output of the incoherent light source.

A particular disadvantage with the use of silicon dioxide glass and doped silicon dioxide glass as the wave-guiding material in the fiber is because of the great difference in the linear thermal expansion coefficient which already exists between the lesser doping in the silicon dioxide glass mantle with a lower refractive index and the doped silicon dioxide core. That is particularly true at the extreme lower linear thermal expansion of the clean silicon dioxide glass. Each contribution of an admixed component lets the expansion coefficient rise irregularly or spasmodically.

The same situation occurs in the case in which a doping of silicon dioxide, for example with boron oxide, is used in a gliding mantle and clean silicon dioxide glass is used in the core material.

There is also until today no optical fiber wave-guide for the signal technology with an adjustment of a linear thermal expansion coefficient. By a polarization expansion test preferably under suitable microscopes are these great linear thermal expansion coefficient differences clearly recognizable as tension differences in the preform and in the fibers.

The advantage of an adjustment of the linear thermal expansion coefficient lies in the following facts.

Only the smallest possible tension differences (these resulting from the expansion differences) are desirable for the manufacture of the inner coating, the preform and the fiber to be drawn therefrom. With the somewhat inexact procedure of the inner coating process and the collapsing process, the freshly deposited layers on the inner coating are torn; the fissures resulting therefrom which even though subsequently temperature-treated cannot be completely healed. Thus, large areas result in the subsequent fiber which leads to increased losses (in dB/KM). Thus the fiber cannot be used for its intended purpose.

Another advantage is shown by the fact that with an adjustment of the linear thermal expansion coefficients between the hollow tube and the inner coating a later division of the preform is possible. To be sure, it was because of the expansion difference and the higher tension in the manufactured preform previously not possible to saw or cut the preform. With cutting the inner coating portion broke because it was under tensile stress or strain.

An additional advantage is to be seen in the fact that by an adjustment of the expansion coefficient and thereby the tension in the preform in future preforms the combined unit can be melted together. That has a significant meaning for the transition from the batch-wise manufacturing process to a continuous finishing process for the production of a large amount of fibers for signalling. Using the melting of individual preforms allows really long preform pieces to be made. Thus the fiber drawing process and the subsequent bundling for a cable can be carried through continuously.

An additional advantage resulting from the equalization of the tension on the inside of the preform by means of adjusting the linear thermal expansion coefficient lies in the fact that the loss which results from the tension in the fiber can be eliminated. This loss is seen as a constant part of the theoretical minimum loss in such optical fiber wave-guides. Through adjustment of the expansion coefficients the theoretical minimum loss boundary can be additionally lowered. In this way, fibers are obtained which are particularly suited for long range signal transmission.

An adjustment of the expansion coefficient from the extreme lower value of the silicon dioxide glass with values between 5 and $8 \times 10^{-7}/°C$. is not possible since the addition of more components in most cases has a subsequent expansion increase. There are many possible components which serve for refractive index gradient profiles in the transmission fibers. Therefore, materials with lowering linear thermal expansion coefficients below $10 \times 10^{-7}/°C$. should not be used for signalling fibers.

The object of the invention is a signal fiber whose linear thermal expansion coefficient in all of the fiber elements (mantle and core material) lies above $15 \times 10^{-7}/°C$. and in which the expansion coefficients in all fiber elements (mantle and core elements) are so arranged with each other that the lowest possible tension differences exist between these elements. This is true for the tension between the hollow tube and the inner coating as well as for the tension on the inside of a preform or a fiber.

An additional object is a wave-guide fiber with a refractive index gradient profile in the area of the core which has a high as possible refractive index in the core material which is significantly and clearly higher than the refractive index of the silicon dioxide glass which is 1.458. These both are, by means of the invention, reached with an optical fiber wave-guide according to the broadest claim.

The optical fiber wave-guide has a refractive index gradient profile and is manufactured with a coating of a particular composition exactly defined in a silicate glass hollow tube according to the deposition process from the gas phase whereby the tube is subsequently collapsed to a preform and then the preform is drawn to a fiber suitable for guiding which will be done by the fiber core. The basic silicate hollow tube material does not participate in the wave-guiding. The silicate glass hollow tube has the following composition.

| Component | Weight % |
| --- | --- |
| $SiO_2$ | |
| $\Sigma\ Al_2O_3 + ZrO_2 + La_2O_3$ | 51–92 |
| $+ TiO_2 + B_2O_3 + P_2O_5$ | 1–40 |
| $P_2O_5$ | 0–5 |
| $B_2O_3$ | 0–26 |
| $Al_2O_3$ | 0–28 |
| $ZrO_2$ | 0–5 |
| Alkali Oxide | |
| and Alkaline Earth Oxide | 2–40 |
| BaO | 0–7 |
| CaO | 0–10 |
| MgO | 0–9 |
| PbO | 0–6 |
| ZnO | 0–8 |
| $La_2O_3$ | 0–6 |
| $Na_2O$ | 0–12 |
| $K_2O$ | 0–8 |
| $Li_2O$ | 0–4 |

This silicate glass hollow tube has a linear thermal expansion coefficient between 14 and $120 \times 10^{-7}/°C$.

The optical fiber wave-guide is in the wave-guide conducting area silicon-dioxide-free and consists of two parts, the inner mantle and the core. The inner silicon-dioxide-free mantle has the following composition.

| Component | Weight % |
| --- | --- |
| $GeO_2$ | 50–100 |
| $P_2O_5$ | 0–45 |
| $B_2O_3$ | 0–20 |
| $Al_2O_3$ | 0–12 |

The linear thermal expansion coefficient of the inner silicon dioxide free mantle corresponds to the linear expansion coefficient of the silicon dioxide glass hollow tube in the outer mantle with a tolerance of $\pm 5 \times 10^{-7}/°C$.

The core, also silicon dioxide free, consists of a mixture of germanium oxide and at least one other other component whereby the amount of the germanium oxide lies above 50% by weight. The composition of this core is as follows.

| Component | Weight % |
| --- | --- |
| $GeO_2$ | 50–99 |
| $Sb_2O_3$ | 0–30 |

-continued

| Component | Weight % |
| --- | --- |
| $Al_2O_3$ | 0–15 |
| $B_2O_3$ | 0–15 |
| $As_2O_3$ | 0–30 |
| BaO | 0–10 |
| PbO | 0–15 |
| Alkali oxide | 0–15 |
| Alkaline Earth Oxide | 0–15 |
| $La_2O_3$ | 0–15 |
| $SnO_2$ | 0–20 |
| $TiO_2$ | 0–20 |
| $WO_3$ | 0–5 |
| ZnO | 0–10 |
| $ZrO_2$ | 0–5 |
| $Ga_2O_3$ | 0–14 |

In the glass composition for the silicon dioxide hollow tube, for the inner mantle and for the fiber core additional elements can be contained therein. For example Ba, Rb, Cs, Sn, As, Sb, Bi, Lanthanides as well as anions, acids and even halogens find use therein.

This silicon-dioxide-free core is compositionally arranged so that because of the concentration changes on the inside of the core a refractive index change is steadily achieved. Thereby the concentration is changed in such a way that after the collapsing step a parabolic refractive index profile is obtained whose exponent for the parabolic equation lies between 1.7 and 2.1.

The optical fiber wave-guide has in the area which results from the inner coating of the hollow tube a refractive index gradient greater than 1.55. This refractive index increases in the area of the core from the outside to the inside.

Also the core is adjusted in the inner part with its linear thermal expansion coefficient as well as the linear expansion coefficient of the outside and that of the inner mantle so that, in spite of the refractive index gradient, no greater deviation than $\pm 12 \times 10^{-7}/°C.$ is to be observed.

The outer silicate mantle can be pulled from a melt and consists of a silicate multi-component glass whose linear thermal expansion coefficient of $15 \times 10^{-7}/°C.$ lies clearly above the linear thermal expansion coefficient of silicon dioxide glass.

The inner silicon-dioxide-free mantle and the silicon-dioxide-free core can be manufactured by the coating of this glass hollow tube according to the deposition process from the gas phase whereby the inner coating after a collapsing to a preform and subsequently a pulling of the preform to a fiber is the wave-guiding fiber element.

The finished fiber wave-guide in characterized by the lower transmission loss and higher transmission capacity as well as the large refractive index difference between the mantle and core material through a high aperture which lies above 0.25.

The inner silicon-dioxide-free mantle consists of germanium oxide or of germanium oxide with an additional element.

The inner silicon-dioxide-free mantle has a lower refractive index than the silicon-dioxide-free core material, in which the refractive index gradient is produced. The inner silicon-dioxide-free mantle as well as the silicon-dioxide-free core have their refractive indices clearly above 1.55.

The linear thermal expansion coefficient in the outer silicate mantle lies between 15 and $120 \times 10^{-7}/°C.$ and the inner silicon dioxide-free mantle is adjusted to this value with a tolerance of $\pm 5 \times 10^{-7}/°C.$ The silicon-dioxide-free core has no greater deviation than $\pm 12 \times 10^{-7}/°C.$ across the outside and the inside mantle.

A silicate glass hollow tube is pulled from the silicate multi-component glass from a fluid melt according to known processes such as the Danner process or according to the vertical sieve process. It has a composition according to Example 1 of Table 2. This hollow rod has, after cooling, a linear thermal expansion coefficient of $77 \times 10^{-7}/°C.$ (All named linear thermal expansion coefficients in this description were obtained by measuring between 20° C. and 300° C.). This hollow glass tube is fastened on a glass blower's lathe between the ends and rotated with a speed of 4 rotations per second. A glass burner with a speed of 6 cm per minute runs back and forth on the support of this lathe under the rotating hollow tube. In this way a temperature of 860° C. is reached in the hollow glass tube. The rotating hollow tube is flushed with a gas mixture of oxygen, germanium chloride and eventually one or more additional components. This gas mixture is produced by an oxygen stream blowing over an exact regulatory system through the slightly vaporizable fluids, for example germanium chloride and other chloride compounds. In FIG. 1 such an apparatus for the production of the gas mixture is shown and the multi-component silicate glass hollow tube to be coated on the inside. In it the gas flowing regulators are designated with M. The acids are blown through with $O_2$, the burners designated by the letter C and the silicate hollow tube with T. The component A is germanium chloride, the component B, X and Y are additional fluid components chosen according to the invention; the component C is a gaseous component according to the invention whose vapor pressure lies above 1 atm (A, B, X and Y have vapor pressures below 1 atm at room temperature). P is a programmer which is set for the changing of the flow-through regulator so that in the course of the inner coating process a refractive index gradient is obtained on the inner coating. A large number of components which can be used are shown in Table 1.

The gases are produced by blowing an oxygen stream over the exact regulating system M through the slightly vaporized fluids of components X, Y, A and B. This oxygen stream carries molecules along from the named components. This gas mixture is deposited in the hollow tube in the area of the burner C as oxides and melted onto the inner wall of the silicate glass hollow tube as a glass film. The free-flowing anions leave the rod in the direction of the arrow. The burner C travels along the hollow tube in the direction of the arrow and turns around upon reaching the end of the tube. With many passes on the tube, a glass layer of between 0.1 to 3 microns is produced if the temperature on the inside of the hollow tube is sufficiently high, if the viscosity of the silicate glass hollow tube is adjusted and if the path-narrowing of the burner is followed according to the above given values.

The individual changes of the oxygen stream through the fluid containers allow changes from layer to layer of the glass deposited on the inner mantle and the core so that one obtains the desired concentration profile of the individual components in the total layer packet of the inner coating.

If components are used which need higher temperatures for their vaporization then the whole tube system can be put in a heating mantle.

As choices from the components in Table 2 phosphorus, boron and aluminum can be used for the lowering of the refractive index of pure germanium oxide which is 1.65 according to the invention until the boundary of 1.55. For raising the refractive index of pure germanium oxide from 1.65 to higher refractive index values titanium, tantalum, zirconium, antimony, lanthanum and other components be mixed along with it. By a specific mixing of the components on the inside the different refractive index profile in the inner mantle and in the core can be produced according to an inner process through the deposition from the gas phase. On the other hand, by specific mixing of the components the linear thermal expansion coefficients can be so arranged that if the expansion coefficient of the multi-component silicate glass of the outside mantle serves as the criterion the linear thermal expansion coefficient of the inner mantle can be adjusted with a tolerance of $\pm 5 \times 10^{-7}/°C$. and that of the core with a tolerance of $\pm 12 \times 10^{-7}/°C$.

Figure 2:
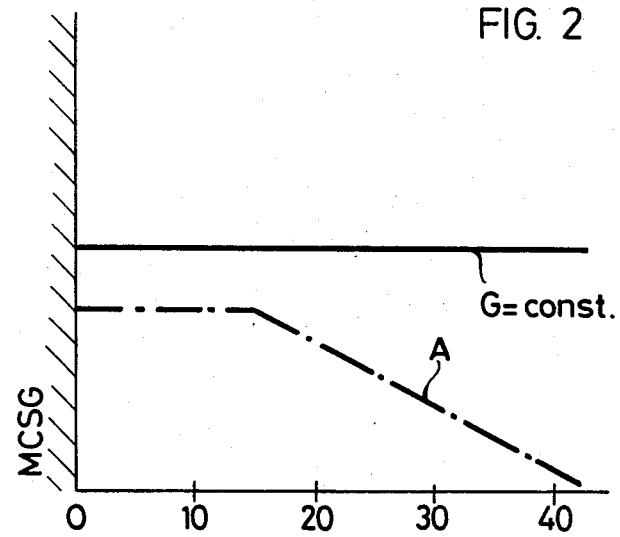
FIG. 2 indicates concentration profiles of coating on tube.
Figure 2:
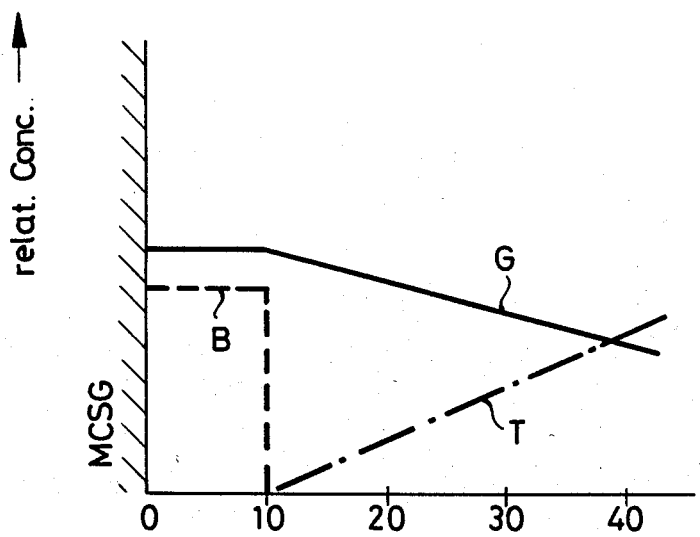
Figure 2:
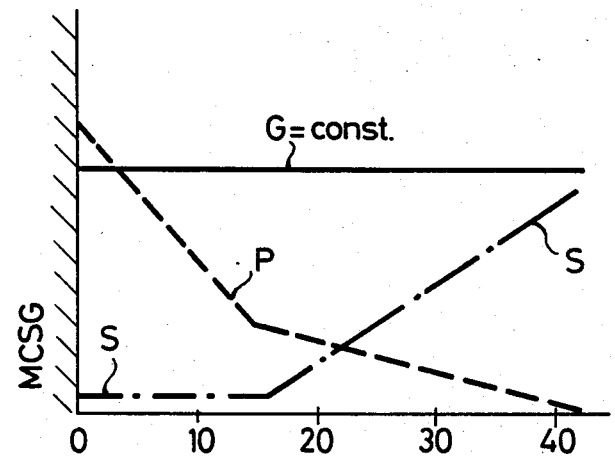
Figure 3:
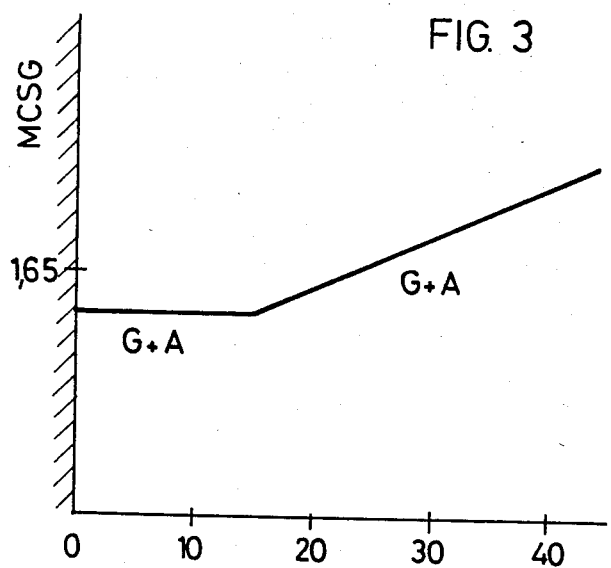
FIG. 3 shows refractive index in the FIG. 2 layers prior to collapse of preform and pulling out to fiber.
Figure 3:
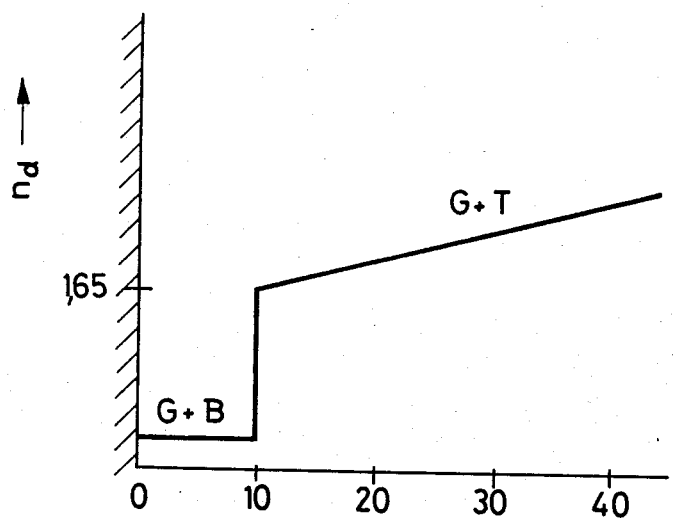
Figure 3:
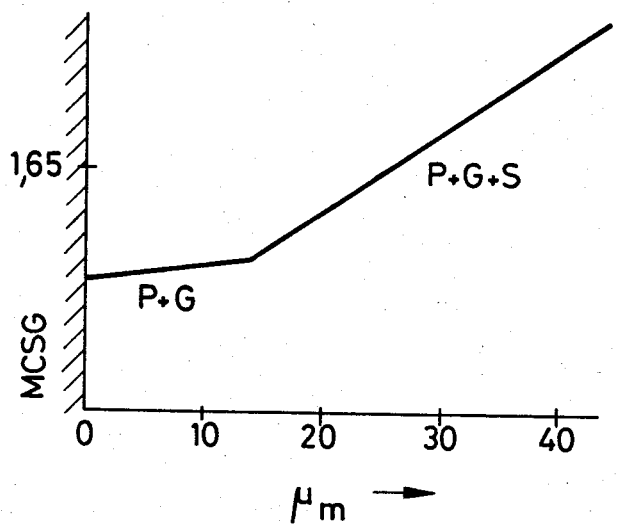

FIG. 2 shows a few possible concentration profiles for the inner coating according to the deposition process from the gas phase. In FIG. 2 the multi-component silicate glass is shown by MCSG. The different oxide components are shown in FIG. 2 as follows: $P = P_2O_5$; $A = Al_2O_3$; $G = GeO_2$; $T = TiO_2$; $S = Sb_2O_3$; $L = La_2O_3$. In FIG. 2 the relative concentration is shown vertically and the thickness of the inner coating is shown horizontally which is, after collapsing to a preform, the inner core and the inner mantle. In FIG. 3 are shown the corresponding refractive index gradients resulting from FIG. 2. This refractive index gradient profile in FIG. 3 is produced before the collapsing to the perform and the pulling out to the fiber. During the collapsing the refractive index profile changes from a linear line to a parabolic curve with an exponent in the parabolic formula between 1.7 and 2.1. In FIG. 3 the refractive index in the layer packet is shown vertically before the collapsing and horizontally the thickness of the produced layer packet by the inner layering according to the deposition process from the gas phase is shown. The letters have the same meaning as in FIG. 2.

In the gas production area according to FIG. 1, the concentration of the germanium component can be either held constant or it can stepwise be lowered, preferably by adding index-increasing-components additively or the concentration of the geranium component can be correspondingly lowered. With the flow-through regulator M which can be regulated electrically both possibilities are shown (FIG. 1). By adding $P_2O_5$ to the germanium oxide as well as using other components which have a lower refractive index than pure germanium oxide usable refractive indexes are obtained if one lowers the concentration of $P_2O_5$ from the outside to the inside and raises the concentration of the germanium from the outside to the inside. This inverse portion can be applied with all components whose refractive index in individual oxides is lower than that of germanium oxide.

Through the mixing of two or more components the adjustment of the refractive index and the linear thermal expansion coefficient is possible, if one adjusts to each the flow-through diminishment of the oxygen through the gas-producing area, the vapor pressure of the different fluids at standardized temperatures in the vaporizing vessels and the reaction temperature in the hollow tube. By converting the amount of oxygen flowing through using a graph of the calibration curve, the needed molar compositions can be regulated for the production of the intended layer composition. The linear thermal expansion coefficient of the attained layer composition can be ascertained experimentally through mixing metallic organic fluids as vehicles or carriers of the respective oxides, hydrolysis of the mixture and the final fusion. Measuring is done on a rod of 5 cm length and 1 mm diameter in a dilatometer.

The second inner silicon dioxide free mantle, as already known, consists of pure germanium oxide alone or of a mixture of several components, of which one is germanium oxide and of another with a compound which lowers the refractive index. For that purpose can preferably be used the components $P_2O_5$, $B_2O_3$ or $Al_2O_3$.

Employing a tube according to Example I with a linear thermal expansion coefficient of $77 \times 10^{-7}/°C$. pure germanium oxide is used as material for the inner silicon-dioxide-free mantle. The above described expansion measurement of the pure germanium oxide gives the linear thermal expansion coefficient of $78 \times 10^{-7}/°C$.

After a sufficiently thick layer packet for the second inner silicon-dioxide-free mantle is attained by 25 passes of the gas burner over the hollow rod with a speed of 6 cm per minute the concentration of germanium is linearly decreasing from 100 weight percent on the inside from 40 layers to 93 weight percent while at the same time the concentration of antimony oxide is increasing linearly in the same number of layers from zero to 7 weight percent. The change of the linear thermal expansion coefficient can be obtained through the use of $B_2O_3$ as well in the boundary so that on one hand a linear refractive index increase in the layer packet is reached and on the other hand the linear thermal expansion coefficient does not change over the tolerance of $\pm 6 \times 10^{-7}/°C$.

According to another example a multi-component silicate glass hollow tube of Example 5 is coated with a deposition from the vapor phase on the inside first with a silicon-dioxide-free mantle consisting of 52 weight percent germanium oxide, 13 weight percent boron oxide, 7 weight percent aluminum oxide, 25 weight percent phosphorus oxide, and 2 weight percent zinc oxide. This inner silicon-dioxide-free mantle has 12 layers. Finally the layer packet for the core material is made according to the deposition process from the gas phase. This core material consists of the same components as the inner silicon dioxide free mantle, however additionally a mixture of antimony oxide, lanthanum oxide and titanium oxide is added to these components. The concentration of this second mixture of antimony oxide, the lanthanum oxide and titanium oxide begins with zero weight percent and increases up and through the layer, which later is known as the core axis, to 8 percent by weight. The ratio of the antimony oxide, lanthanum oxide and titanium oxide is 2:1:1. Under the expansion tests the preform attained with the inner coating of this material shows only a slight stress. It can be sawed without difficulty and melted together with other similarly made preforms to an endless preform for the continuous manufacture of wave-guide fibers. A large number of additional silicate glass hollow tubes with an inner silicon dioxide free mantle which show a difference in the linear thermal expansion coefficient of not more than $\pm 5 \times 10^{-7}/°C$. on the inside, wherein the coating with the core glass material is joined such that the linear thermal expansion coefficient of the core material is not more than $\pm 12 \times 10^{-7}$/°C. from that of the inner mantle and that of the outer mantle.

Particularly good wave-guiding fibers are obtained if the refractive index gradient in the core is so made that it follows the formula for parabola with the exponent between 1.7 and 2.1. Thus it is especially useful or desirable if the refractive index of all the material manufactured following the deposition process in the gas phase has a value over 1.55; thus, clearly over that the silicon dioxide glass which lies at 1.458. Particularly preferred in the core material besides the germanium oxide are the components antimony, phosphorus, and/or zinc in an oxide concentration between 1 and 50 percent by weight. Preferably, the silicate glass hollow tube for the outside mantle consists of a composition within the following formula. One one hand the sum of $Al_2O_3$, $ZrO_2$, $La_2O_3$, $TiO_2$, $B_2O_3$, and $P_2O_5$ should lie between 1 and 40 weight percent and on the other hand the alkali oxides and the alkaline earth oxides should lie between 2 and 40 weight percent.

Table 1 Part 1

| Formula | Melting Point in °C. | Vapor Pressure at 760mm at °C. | Oxide | Refractive Index | Formula | Melting Point in °C. | Vapor Pressure at 760mm at °C. | Oxide | Refractive Index |
|---|---|---|---|---|---|---|---|---|---|
| $AlB_3H_{12}$ | −64.5 | 45.9 | $Al_2O_3$ | 1.65 | PbI | 402.0 | 872.0 | PbO | 2.61 |
| $BCl_3$ | −107.0 | 12.7 | $B_2O_3$ | 1.64 | $PCl_3$ | −111.8 | 74.2 | $P_2O_5$ | 1.509 |
| | | | | | $POCl_3$ | 2.0 | 105.1 | $P_2O_5$ | 1.509 |
| $AlBr_3$ | 97.5 | 256.3 | $Al_2O_3$ | 1.63 | LiBr | 547.0 | 1310.0 | $Li_2O$ | 1.644 |
| $AlCl_3$ | 192.4 | 180.3 | $Al_2O_3$ | 1.65 | LiCl | 614.0 | 1382.0 | $Li_2O$ | 1.644 |
| $SbBr_3$ | 96.6 | 275.0 | $Sb_2O_3$ | 2.35 | Mg | 651.0 | 1107.0 | MgO | 1.736 |
| $SbCl_3$ | 73.4 | 219.0 | $Sb_2O_3$ | 2.35 | $MgCl_2$ | 712.0 | 1418.0 | MgO | 1.736 |
| $SbI_3$ | 167.0 | 401.0 | $Sb_2O_3$ | 2.35 | $MnCl_2$ | 650.0 | 1190.0 | $MnO_2$ | 2.16 |
| $Sb_2O_3$ | 656.0 | 1425.0 | $Sb_2O_3$ | 2.35 | $HgBr_2$ | 237.0 | 319.0 | HgO | 2.55 |
| As | 814.0 | 610.0 | $As_2O_3$ | 1.755 | $HgCl_2$ | 277.0 | 304.0 | HgO | 2.55 |
| | | | | | $HgI_2$ | 259.0 | 354.0 | HgO | 2.55 |
| $AsCl_3$ | −18.0 | 130.4 | $As_2O_3$ | 1.755 | $MoF_6$ | 17.0 | 36.0 | $MoO_3$ | 1.68 |
| $AsF_3$ | −5.9 | 56.3 | $As_2O_3$ | 1.755 | $PBr_3$ | −40.0 | 175.3 | $P_2O_5$ | 1.509 |
| $AsF_5$ | −79.8 | −52.8 | $As_2O_3$ | 1.755 | KBr | 730.0 | 1383.0 | $K_2O$ | 1.608 |
| $As_2O_3$ | 312.8 | 457.2 | $As_2O_3$ | 1.755 | KCl | 790.0 | 1407.0 | $K_2O$ | 1.608 |
| Ba | 850.0 | 1638.0 | BaO | 1.98 | KF | 880.0 | 1502.0 | $K_2O$ | 1.608 |
| $BeB_2H_8$ | 123.0 | 90.0 | BeO $B_2O_3$ | 1.73 1.64 | KI | 723.0 | 1324.0 | $K_2O$ | 1.608 |

Table 1 Part 2

| Formula | Melting Point in °C. | Vapor Pressure at 760mm at °C. | Oxide | Refractive Index | Formula | Melting Point in °C. | Vapor Pressure at 760mm at °C. | Oxide | Refractive Index |
|---|---|---|---|---|---|---|---|---|---|
| $BeCl_2$ | 403.0 | 487.0 | BeO | 1.73 | Rb | 38.5 | 679.0 | $Rb_2O$ | 1.642 |
| $BeI_2$ | 488.0 | 487.0 | BeO | 1.73 | RbBr | 682.0 | 1152.0 | $Rb_2O$ | 1.642 |
| $BiBr_3$ | 218.0 | 461.0 | $Bi_2O_3$ | 1.91 | RbCl | 715.0 | 1361.0 | $Rb_2O$ | 1.642 |
| $BiCl_3$ | 230.0 | 441.0 | $Bi_2O_3$ | 1.91 | $LaCl_3$ | 860.0 | 1072.7 | $La_2O_3$ | 1.87 |
| Cd | 320.9 | 763.0 | CdO | 2.49 | NaBr | 755.0 | 1392.0 | $Na_2O$ | 1.595 |
| $CdCl_2$ | 568.0 | 967.0 | CdO | 2.49 | NaCl | 800.0 | 1465.0 | $Na_2O$ | 1.595 |
| $CaBr_2$ | 730.0 | 812.0 | CaO | 1.838 | $SnBr_4$ | 31.0 | 204.7 | $SnO_2$ | 2.045 |
| $CdI_2$ | 385.0 | 796.0 | CdO | 2.49 | $SnCl_4$ | −30.2 | 113.0 | $SnO_2$ | 2.045 |
| Cs | 18.5 | 690.0 | $Cs_2O$ | 1.64 | $TeCl_4$ | 224.0 | 392.0 | $TeO_2$ | 2.09 |
| CsBr | 636.0 | 1300.0 | $Cs_2O$ | 1.64 | $TeF_6$ | −37.8 | −38.6 | $TeO_2$ | 2.09 |
| CsCl | 646.0 | 1300.0 | $Cs_2O$ | 1.64 | TlBr | 460.0 | 819.0 | $Tl_2O$ | 2.13 |
| $CaCl_3$ | 77.0 | 200.0 | $Ca_2O$ | 1.90 | TlCl | 430.0 | 807.0 | $Tl_2O$ | 2.13 |
| $CsH_4$ | −165.0 | −88.9 | $CsO_2$ | 1.650 | $TiCl_4$ | −30.0 | 136.0 | $TiO_2$ | 2.759 |
| $CeBr_4$ | 26.1 | 189.0 | $CeO_2$ | 1.650 | $WF_6$ | −0.5 | 17.3 | $WO_3$ | 2.52 |
| $PbBr_2$ | 373.0 | 914.0 | PbO | 2.61 | $ZnCl_2$ | 283.0 | 732.0 | ZnO | 2.029 |
| $PbCl_2$ | 501.0 | 954.0 | PbO | 2.61 | $ZrCl_4$ | 437.0 | | $ZrO_2$ | 2.20 |
| $PbF_2$ | 855.0 | 1293.0 | PbO | 2.61 | $ZrBr_4$ | 450.0 | | $ZrO_2$ | 2.20 |

TABLE 2

| Example Nr. | 1 | 2 | 3 | 4 | 5 | 6 | 7 | 8 | 9 | 10 |
|---|---|---|---|---|---|---|---|---|---|---|
| $SiO_2$ | 69.8 | 79.7 | 91.1 | 69.5 | 75.5 | 56.0 | 55.5 | 51.5 | 64.1 | 57.4 |
| $P_2O_5$ | — | — | — | — | — | — | 0.5 | 4.0 | — | 4.0 |
| $B_2O_3$ | 9.2 | 10.3 | 4.6 | 1.4 | 9.0 | 10.5 | 15.7 | 1.0 | 25.0 | — |
| $Al_2O_3$ | 5.1 | 3.1 | 0.4 | 4.2 | 5.0 | 20.0 | 5.0 | 19.1 | — | 4.8 |
| $ZrO_2$ | — | — | — | — | — | 0.3 | 3.0 | 1.5 | — | 0.5 |
| BaO | — | — | — | — | 3.6 | — | 6.0 | 0.9 | — | 6.9 |
| CaO | 1.0 | 0.8 | 1.6 | 7.8 | — | 4.8 | — | 9.5 | 0.5 | 4.0 |
| MgO | 3.8 | 0.9 | — | — | — | 8.0 | 1.5 | 4.5 | — | — |
| PbO | — | — | — | — | — | — | 4.0 | 1.0 | — | 6.0 |
| ZnO | — | — | 0.5 | — | — | — | — | 7.0 | — | 3.2 |
| $La_2O_3$ | — | — | — | — | 0.4 | — | 1.5 | — | 0.3 | — |
| $Na_2O$ | 4.9 | 5.2 | 1.5 | 10.8 | 5.3 | 0.4 | 2.1 | — | 5.3 | 5.2 |
| $K_2O$ | 6.2 | — | — | 5.3 | 1.2 | — | 3.0 | — | 4.8 | 8.0 |
| $Li_2O$ | — | — | 0.3 | — | — | — | 2.2 | — | — | — |
| $\alpha \times 10^7$/°C. | 77 | 32 | 16 | 70 | 50 | 38 | 56 | 61 | 43 | 104 |

EXAMPLE I

A wave-guiding fiber with a refractive index gradient profile is manufactured according to the invention in which a glass tube with the composition given below has layers deposited on the inside of the glass tube according to the modified vapor deposition process. The composition of the glass tube is:

| Component | Weight % |
|---|---|
| $SiO_2$ | 71.0 |
| $B_2O_3$ | 18.8 |
| $Al_2O_3$ | 3.1 |
| $Na_2O$ | 5.9 |
| $K_2O$ | 1.2 |

This layering on the inside is an oxide deposition from a mixture from a carrier gas oxygen (excess oxygen) and additional gas mixtures, which results from oxygen blowing through fluids as shown in FIG. 1 and the entrained components deposited as oxides in the partially heated tube of FIG. 1.

The fluids in the example are:
- A = $GeCl_4$ at 25° C.
- B = $POCl_3$ at 20° C.
- X = $SbCl_5$ at 45° C.
- Y = $GaCl_3$ at 90° C.

These fluids are in thermostatic containers which keep the nominal temperature at ±0.5 degrees in order to maintain a constant vapor pressure.

An additional gas-forming component is added to the gas mixture which is designated Z and is $BCl_3$ and is thermostatically at −4° C. Altogether 56 layers are deposited on the inside of the silicate glass tube used. The viscosity of the glass tube of the above composition is characterized by a transformation temperature of 470° C., a melting point of 740° C. and an operating temperature of 1100° C. For the adequate separation of the oxide from the gas mixture, of the metal chlorides and the oxygen a minimum temperature of 890° C. is employed. For this reason, the designated burner in FIG. 1 may in that position which it takes running back and forth under the tube, maximumly bring only half of the circumference of the tube to the separation temperature. Thus, it is that the other half of the circumference remains below 700° C. Deformation of the tube under influence of temperature is done with a sufficiently slow rotation of the tube. In this trial a rotation of 18 revolutions per minute was used. The temperature in the heated area of the tube was 970° C., the temperature in the cold part of the tube circumference lay between 570° and 630° C. The composition of layers 1-15 was held constant. For it 300 ml/min $O_2$ (excess oxygen) with 15 ml/min $BCl_3$ as well as 270 ml/min oxygen which has streamed through the $GeCl_4$ vessel and 10 ml/min oxygen which has streamed through the $POCl_3$ vessel are mixed and sent through the glass tube heated. (See FIG. 1.) The glass tube in this trial is 1.15 m long, has an outside diameter of 24 mm and an inside diameter of 15 mm. The injection stage which the oxygen stream (smaller than 0.5 mm) must penetrate in the vessels containing fluids is larger than 20 cm and smaller than 22 cm. This gas mixture which includes additional oxygen is decomposed in the tube at the above given temperature. The burner is heated with hydrogen and oxygen. The temperature is detected pyrometrically and serves for the regulation of the hydrogen stream in the burner. The tube guide, through which the gas mixture streams, is heated to 90° C. by a heating sleeve.

Layer 16 differs considerably from the first 15 layers. The oxygen stream through the germanium chloride is raised about 4 ml/min, the stream of $BCl_3$ is drastically lowered to 3 ml/min. The amount of oxygen which also streams through the vessel with $POCl_3$ is also raised to 14 ml/min. Added to the gas mixture for the first time in layer 16 is oxygen which has been streamed through the vessel with $SbCl_5$. During the production of layer 16 4 ml/min of oxygen streams through the $SbCl_5$ vessel. Also for the first time in layer 16 3 ml/min of oxygen streams through the vessel containing gallium chloride. The subsequent layers 17 to 56 differ from layer 15 in that from layer to layer the oxygen streams through the vessel with germanium chloride, phosphorus oxychloride, antimony chloride and gallium chloride are increased step by step. The increase for the vessel with $GeCl_4$ is about 4 ml/min, for $POCl_3$ about 2 ml/min, for $SbCl_5$ about 2 ml/min and for $GaCl_3$ about 1 ml/min from layer to layer.

From layer 17 to 56 the temperature remains constant. At the end of layer 56 the tube is stepwise collapsed in 8 passes of the burner, while the excess oxygen is halved stepwise. The temperature for the first collapsing step is 1235° C. For the 7th and 8th passes of the burner, the temperature is raised to 1300° C. The other components of the gas mixture were already turned off during the collapsing process. Also before the final collapsing step, the remaining oxygen is turned off. Thus, a 80 cm preform with a preform diameter of 16 mm is obtained. From this preform at 1400° C. in a carbon resistance oven a 3062 m fiber is pulled, which has a fiber diameter of 115 microns. The drawing rate for pulling the fiber from the preform is 25 m/min. The optical loss or attenuation at a wave length of 860 nm compared with a corresponding laser beam gives a value of 5 dB/km, the pulse dispersion of a test pulse is 3 nsec/km. The core diameter of the fiber is 45 microns. The tensile strength of the fiber is 400 N/mm. The refractive index profile in the fiber, based on layers 17 to 56, corresponds to an exponent $a = 1.9$ in the parabolic formula $y = x^a$.

The linear thermal expansion coefficient of the glass tube is $53 \times 10^{-7}$/°C. The linear thermal expansion coefficient of the core material, which is the result of the inner layering, is adjusted to the coefficient of the glass tube. By wet-chemical analysis of the core material and subsequent melting of the analytically established concentration in a platinum crucible at 1650° C. a glass is obtained which has a linear thermal coefficient of expansion of $56 \times 10^{-7}$/°C. in the area between 20° and 300° C. The refractive index of this glass is 1.58.

I claim:

1. Optical fiber wave-guide for signal transmission whose linear thermal expansion coefficient in all of the fiber elements lies above $15 \times 10^{-7}$/°C. characterized in that the optical fiber wave-guide consists of an outer mantle which is composed of the following components:

| Component | Weight % |
|---|---|
| $SiO_2$ | 51–92 |
| $\Sigma\ Al_2O_3 + ZrO_2 + La_2O_3 + TiO_2 + B_2O_3 + P_2O_5$ | 1–40 |
| $P_2O_5$ | 0–5 |
| $B_2O_3$ | 0–26 |
| $Al_2O_3$ | 0–28 |

-continued

| Component | Weight % |
|---|---|
| $ZrO_2$ | 0–5 |
| Alkali Oxide | |
| Σ + Alkaline Earth Oxide | 2–40 |
| BaO | 0–7 |
| CaO | 0–10 |
| MgO | 0–9 |
| PbO | 0–6 |
| ZnO | 0–8 |
| $La_2O_3$ | 0–6 |
| $Na_2O$ | 0–12 |
| $K_2O$ | 0–8 |
| $Li_2O$ | 0–4 | which is silicate glass drawn from a melt, and has a linear thermal expansion coefficient which lies between 15 and $120 \times 10^{-7}/°C$., and the optical fiber wave-guide has a second, inner $SiO_2$-free mantle which is composed of the following components:

| Component | Weight % |
|---|---|
| $GeO_2$ | 50–100 |
| $P_2O_5$ | 0–45 |
| $B_2O_3$ | 0–20 |
| $Al_2O_3$ | 0–12 | and corresponds in its linear thermal expansion coefficient to that of the outer mantle with a tolerance of $\pm 5 \times 10^{-7}/°C$., and the optical fiber wave-guide has an inner, $SiO_2$-free core, which is composed of 50–99 weight percent of $GeO_2$ and at least two oxides selected from the group consisting of $Sb_2O_3$, $Al_2O_3$, $B_2O_3$, $As_2O_3$, BaO, PbO, alkali oxide, alkaline earth oxide, $La_2O_3$, $SnO_2$, $TiO_2$, $WO_3$, ZnO, $ZrO_2$, and $Ga_2O_3$, and characterized in that the inner mantle and the core are produced as an inner layering on the inside surface of a silicate glass tube by vapor deposition process from the gas phase, characterized in that the refractive index $n_d$ in the total vapor deposited inner layer lies above 1.55 and increases from the outside to the inside of the inner layer, which inner layered tube is collapsed to a preform and the preform is drawn to a fiber and the core has a refractive index gradient which corresponds to the formula for a parabola with an exponent between 1.7 and 2.1.

2. Optical fiber wave-guide according to claim 1, characterized in that for the production of a refractive index gradient at least two components of antimony, phosphorus or zinc are added to the germanium in an oxide concentration between 1 and 50 weight percent.

3. Optical fiber wave-guide, characterized in that the wave-guiding area consists of at least two zones, in which the outer zone has no refractive index gradient and consists of a mixture of germanium oxide and one or more components according to claim 2, while the inner zone has a refractive index gradient and consists of a mixture of 50 to 99 weight percent germanium as well as 1 to 50 weight percent of more than one additional component according to claim 2.

4. Optical fiber wave-guide according to claim 1, characterized in that even the core in the interior is adjusted with its linear thermal expansion coefficient to that of the linear thermal expansion coefficients of the outer and inner mantles so that the deviation is not more than $\pm 12 \times 10^{-7}/°C$.

5. Optical fiber wave-guide for signal transmission whose linear thermal expansion coefficient in all of the fiber elements lies above $15 \times 10^{-7}/°C$. characterized in that the optical fiber wave-guide consists of an outer silicate glass mantle and has a linear thermal expansion coefficient which lies between 15 and $120 \times 10^{-7}/°C$., and the optical fiber wave-guide has a second, inner $SiO_2$-free mantle which is composed of the following components: $GeO_2$, $P_2O_5$, $B_2O_3$, $Al_2O_3$, and ZnO, and corresponds in its linear thermal expansion coefficient to that of the outer mantle with a tolerance of $\pm 5 \times 10^{-7}/°C$., and the optical fiber wave-guide has an inner, $SiO_2$-free core, which is composed of the following components: $GeO_2$, $P_2O_5$, $B_2O_3$, $Al_2O_3$, ZnO, $Sb_2O_3$, $La_2O_3$, and $TiO_2$, and the inner mantle and the core are produced as an inner layering on the inside surface of a silicate glass tube by the vapor deposition process from the gas phase characterized in that the refractive index $n_d$ in the total vapor deposited inner layer lies about 1.55 and increases from the outside to the inside of the inner layer, which inner layered tube is collapsed to a preform and the preform is drawn to a fiber and the core has a refractive index gradient which corresponds to the formula for a parabola with an exponent between 1.7 and 2.1.

6. Optical fiber wave-guide for signal transmission whose linear thermal expansion coefficient in all of the fiber elements lies above $15 \times 10^{-7}/°C$. comprising an outer mantle of silicate glass and has a linear thermal expansion coefficient which lies between 15 and $120 \times 10^{-7}/°C$. and the optical fiber guide has a second, inner silicon-dioxide free mantle which is composed of $GeO_2$ from 50–99% and at least one other oxide selected from the group consisting of $P_2O_5$, $B_2O_3$, $Al_2O_3$ and ZnO and corresponds in its linear thermal expansion coefficient to that of the outer mantle with a tolerance of $\pm 5 \times 10^{-7}/°C$., and the optical fiber wave-guide has an inner, silicon-dioxide-free core which is composed of 50–99% germanium oxide and at least 2 other oxides selected from the group consisting of $Sb_2O_3$, $Al_2O_3$, $B_2O_3$, $As_2O_3$, BaO, PbO, alkali oxide, alkaline earth oxide, $La_2O_3$, $Sn_2O_3$, $TiO_2$, $WO_3$, ZnO, $ZrO_2$, and $Ga_2O_3$ and the inner mantle and the core are produced by chemical vapor deposition on the inside of a silicate glass tube characterized in that the refractive index $n_d$ in the total vapor deposited inner layer lies above 1.55 and increases from the outside to the inside of the inner layer and the tube is collapsed to a preform and the preform is drawn to a fiber and the core has a refractive index gradient which corresponds to the formula for a parabola with an exponent between 1.7 and 2.1.

7. A fiber wave-guide of claim 6 in which the inner mantle consists essentially of $GeO_2$, $P_2O_5$, $B_2O_3$, $Al_2O_3$ and ZnO.

* * * * *